(12) United States Patent  
Brannon et al.

(10) Patent No.: US 7,375,912 B2
(45) Date of Patent: May 20, 2008

(54) DISK DRIVE FLY HEIGHT CONTROL BASED ON CONSTANT POWER DISSIPATION IN READ/WRITE HEAD HEATERS

(75) Inventors: Craig M. Brannon, Maplewood, MN (US); Indumini W. Ranmuthu, Plano, TX (US); Siang Tong Tan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/394,967

(22) Filed: Mar. 31, 2006

(65) Prior Publication Data

US 2006/0268445 A1 Nov. 30, 2006

Related U.S. Application Data

(60) Provisional application No. 60/685,918, filed on May 31, 2005.

(51) Int. Cl.
*G11B 21/02* (2006.01)
(52) U.S. Cl. ...................................... 360/75
(58) Field of Classification Search ..................... None
See application file for complete search history.

(56) References Cited

U.S. PATENT DOCUMENTS 5,991,113 A 11/1999 Meyer et al.
2004/0190175 A1 9/2004 Chey et al.
2005/0105204 A1 5/2005 Bloodworth et al.
2005/0128630 A1 6/2005 Huang et al.
2005/0201001 A1* 9/2005 Conteras et al. ............... 360/75
2005/0213243 A1* 9/2005 Huang et al. .................. 360/75
2007/0014041 A1* 1/2007 Lille et al. ...................... 360/6

* cited by examiner

*Primary Examiner*—Andrew L. Sniezek
(74) *Attorney, Agent, or Firm*—Wade J. Brady, III; Frederick J. Telecky, Jr.

(57) ABSTRACT

A fly height controller circuit for a disk drive head having a resistive heater is disclosed. The fly height controller includes an error amplifier that controls a variable current source driving the resistive heater. The error amplifier compares a desired heater power signal with a feedback power signal that is generated by a multiplier. The multiplier receives a signal corresponding to the resistive heater current, for example as generated by a second variable current source also controlled by the error amplifier, and a signal corresponding to a voltage across the resistive heater. A first differential amplifier develops a differential voltage corresponding to the heater voltage. A second differential amplifier is biased by the resistive heater current signal, and receives the differential voltage form the first differential amplifier. A differential current generated by the second differential amplifier produces the feedback power signal as an output voltage.

18 Claims, 3 Drawing Sheets

DISK DRIVE FLY HEIGHT CONTROL BASED ON CONSTANT POWER DISSIPATION IN READ/WRITE HEAD HEATERS

CROSS-REFERENCE TO RELATED APPLICATIONS

This application claims priority, under 35 U.S.C. §119(e), of Provisional Application No. 60/685,918, filed May 31, 2005, which is incorporated herein by this reference.

STATEMENT REGARDING FEDERALLY SPONSORED RESEARCH OR DEVELOPMENT

Not applicable.

BACKGROUND OF THE INVENTION

This invention is in the field of control circuitry for magnetic storage media drives, and is more specifically directed to fly height control circuitry involving read/write head heaters in such drives.

Continuing progress toward higher performance yet less expensive electronic systems has resulted in large part from advances in nonvolatile data storage technology. The "workhorse" technology for nonvolatile data storage has, of course, been the magnetic disk drive. Magnetic disk drives are used over a wide range of electronic systems, including large-scale network servers, desktop workstations, portable computers, and even now in modern handheld devices such as portable digital audio players.

As is well known in the art, the capacity of conventional disk drives has greatly increased over recent years, at ever decreasing cost per megabit. This capacity increase is directly related to improvements in the density with which data can be stored on the disk medium. Advances in disk drive technology have decreased the surface area required to reliably and retrievably store a bit along a "track" on the disk surface, and have also decreased the spacing between adjacent tracks. This reduction in the active disk surface area per unit of storage has been enabled, in large part, by corresponding reductions in the size and precision of the magnetic transducers that effect the writing and reading operations in magnetic disk drives.

In conventional magnetic disk drives, the writing and reading of stored data is carried out by way of near-field magnetic processes. To write data, ferromagnetic domains at the disk surface are selectively oriented by applying a magnetic field in close proximity to the disk surface. One type of conventional write transducer, or "head", is the well-known inductive writer, which includes an electromagnet having a gap that can be positioned near the magnetic disk surface. The electromagnet is selectively energized to establish a magnetic field, at the gap, that is strong enough to define a magnetic transition pattern of the desired polarity at the addressed location of the disk surface. Data is read from the disk by sensing the polarity of the magnetic field established by these magnetic transition patterns. Conventional read transducers include inductive heads consisting of an electromagnet (which may be the same electromagnet used to write data) in which a current is induced by the magnetic fields at the disk surface. More recently, magnetoresistive (MR) read heads, having a resistance that varies with the polarity of the magnetic field, have become popular.

In modern disk drives, the read/write heads are disposed within a slider at the distal end of a head gimbal assembly (HGA) suspension. The flexible HGA suspension is attached to an actuator, which includes a so-called "voice coil" motor that positions the heads at the desired radial locations of the disk surface. The relative motion between the spinning disk surface and the slider creates a lifting force on the slider, establishing an air bearing surface (ABS) on which the slider rides over the disk surface. Typically, the heads are located at the trailing edge of the slider, which is typically closer to the disk surface than is the slider leading edge.

In connection with these near-field mechanisms, the magnetic field strength increases exponentially as the distance between the magnetic transducers (read/write heads) and the magnetized disk surface decreases. Because the signal strength of the stored data depends on the magnetic field strength, the density of data storage per unit area of disk surface, for a given bit error rate (BER), depends strongly on the distance between the heads and the disk surface. Accordingly, the spacing maintained by the air bearing surface (ABS) between the read/write heads and the disk surface, referred to in the art as the "fly height" of the heads, is an important parameter in the data capacity of a magnetic disk. In modern conventional disk drives, the mean fly height is on the order of a few nanometers, which has enabled the very high data densities attained by modern disk drives.

However, low fly heights tend to increase the wear of both the disk surface and the read-write heads. At extremely low fly heights, relatively small asperities in the disk surface can cause contact between the slider and the disk surface, depleting and degrading lubricants, causing wear on both the slider and the disk surface and causing contamination from wear particles, and in some cases causing the heads to stick at locations of the disk surface where contact is made.

Disk drive manufacturers are thus faced with a tradeoff between disk drive reliability, on one hand, and data density and BER, on the other hand, in determining the desired fly height of the read/write heads. The precision with which the fly height can be controlled is therefore an important factor in maximizing the data density and minimizing the BER, within the reliability constraints for the disk drive.

Especially in recent years, the fly height has depended largely on the temperature of the poles of the inductive write head. It is known that the writing current conducted by the inductive write head causes resistive heating and thus thermal expansion of the poles in the read/write head, typically manifest in the electromagnet poles protruding from the slider toward the disk surface. Modern disk drives take advantage of the thermal expansion of the write head poles in achieving low fly heights, and in controlling the fly height. In this regard, it is known to include a resistor within the slider of a disk drive read/write head, to serve as a resistive heater, so that thermal expansion of the electromagnet poles cause them to protrude toward the disk surface, reducing the fly height. U.S. Pat. No. 5,991,113 describes an example of such a resistive heater.

By way of further background, copending and commonly assigned U.S. patent application Ser. No. 10/715,217, filed Nov. 17, 2003, and published as U.S. Patent Application Publication No. US 2005/0105204 on May 19, 2005, describes a fly height controller that applies different drive levels to a resistive heater in read and write operations. These different heater drive levels account for the increased current drive to the inductive write heads, and thus increased heating of the slider, during write operations relative to the current conducted through the head during read operations.

Conventional fly height controllers using a resistive heater in the read/write head assembly operate by feedback control of either the voltage across the resistive heater, or of the current through the resistive heater. For previous generations of disk drives, control of the resistive heater drive in this manner has been sufficient. As the desired data density continues to increase, however, and with the need for continuing miniaturization of disk drives, more precise fly height control has become necessary.

BRIEF SUMMARY OF THE INVENTION

It is therefore an object of this invention to provide a disk drive fly height control system and method having improved precision.

It is a further object of this invention to provide such a system and method in which variations in the resistance of the resistive heater are compensated.

It is a further object of this invention to provide such a system and method in which the power dissipated by a resistive heater in a disk drive read/write head can be precisely controlled regardless of the instantaneous resistance of the resistive heater.

It is a further object of this invention to provide such a system and method that can be readily implemented into modern preamplifier architectures.

Other objects and advantages of this invention will be apparent to those of ordinary skill in the art having reference to the following specification together with its drawings.

This invention may be implemented into a fly height controller for a disk drive, in which both the current applied to a read/write head resistive heater and also the voltage across the resistive heater are sensed. A feedback signal corresponding to the product of the sensed voltage and sensed current is produced, and applied to an error amplifier, which in turn modulates the drive signal to the resistive heater. Constant power dissipation through the resistive heater can thus be maintained.

DETAILED DESCRIPTION OF THE INVENTION

This invention will be described in connection with its preferred embodiment, namely as implemented into a magnetic disk drive system for an electronic system, such as a computer or a handheld device such as a digital audio player. It is contemplated, however, that this invention may be useful in other applications beyond those illustrated and described in this specification. Accordingly, it is to be understood that the following description is provided by way of example only, and is not intended to limit the true scope of this invention as claimed.

Figure 1:
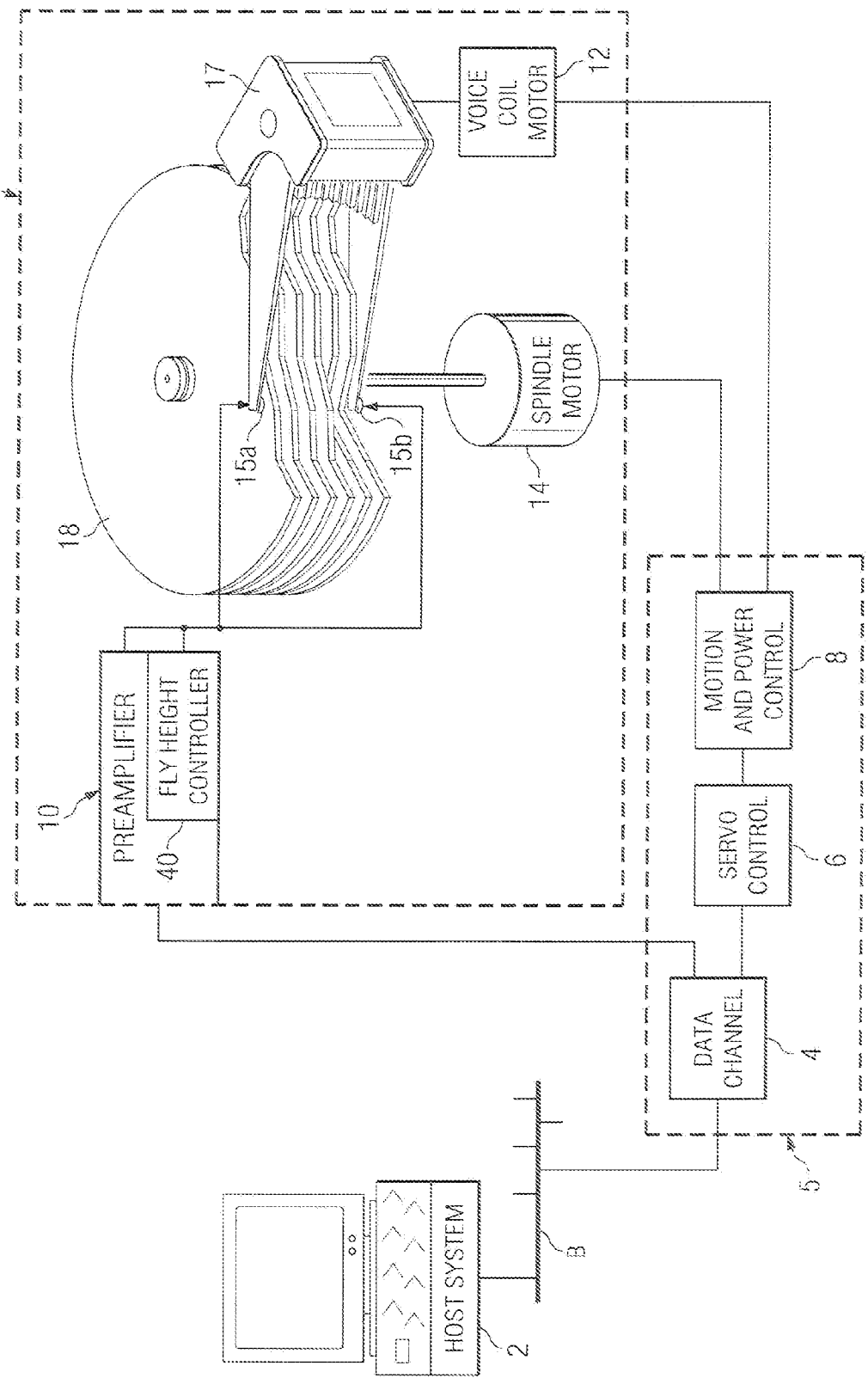
FIG. 1 is an electrical diagram, in block form, of a computer system including a hard disk drive subsystem and control circuitry, constructed according to the preferred embodiment of the invention.

FIG. 1 illustrates an illustrative example of an electronic system into which the preferred embodiment of the invention is implemented. As mentioned above, a wide variety of modern systems utilize magnetic disk drives, such systems ranging in size from large-scale network services to handheld digital audio players, with personal computers and workstations and other systems between these extremes. In FIG. 1, host system 2 generically represents the host functionality for the particular system including a magnetic disk drive. In this generic representation, host system 2 is realized in the conventional manner, including the appropriate central processing unit (CPU), random access memory (RAM), video and sound cards or functionality, network interface capability, and the like. In this example, host system 2 connects (via a host adapter or other such function) to system bus B, to which disk drive controller 5 is connected. Bus B may be implemented according to conventional standards, examples of which include the Enhanced Integrated Drive Electronics (EIDE) standard or the Small Computer System Interface (SCSI) standard. Other disk storage devices (hard disk controllers, floppy drive controllers, etc.) and other peripherals may also be connected to bus B, as desired and in the conventional manner.

Controller 5 is a conventional disk drive controller as known in the art. In modern disk drives in which the drive electronics are implemented at the disk drive rather than as a controller within host system 2 itself, controller 5 is implemented in a printed circuit board within the disk drive enclosure. Alternatively, for example in larger scale systems, controller 5 may be implemented within host system 2. In the generalized block diagram of FIG. 1, the components of controller 5 are shown according to their functions rather than their physical integrated circuits, for the sake of clarity. Typical integrated circuits used to implement disk drive controllers such as controller 5 include a digital signal processor (DSP), read-only memory (ROM) and random access memory (RAM), other non-volatile storage such as flash RAM, interface circuitry connected to bus B, and other custom logic circuitry. Functionally, controller 5 includes data channel 4, which is interfaced with bus B and effects the function of communicating data to and from preamplifier 10 at head-disk assembly 20. Data channel 4 is also in communication with servo control 6, which may also include a demodulation function. Servo control 6 in turn communicates with motion and power controller 8, which drives voice coil motor 12 and spindle motor 14 in head-disk assembly 20.

Head-disk assembly 20 includes the electronic and mechanical components that are involved in the writing and reading of magnetically stored data. In this example, head-disk assembly 20 includes one or more disks 18 having ferromagnetic surfaces (preferably on both sides) that spin about their axis under the control of spindle motor 14. Multiple read/write head assemblies 15a, 15b are movable by actuator 17. Accordingly, signals from motion and power control function 8 in controller 5 control spindle motor 14 and voice coil motor 12 so that actuator 17 places the read/write head assemblies 15a, 15b at the desired locations of disk surface 18 to write or read the desired data.

Figure 2:
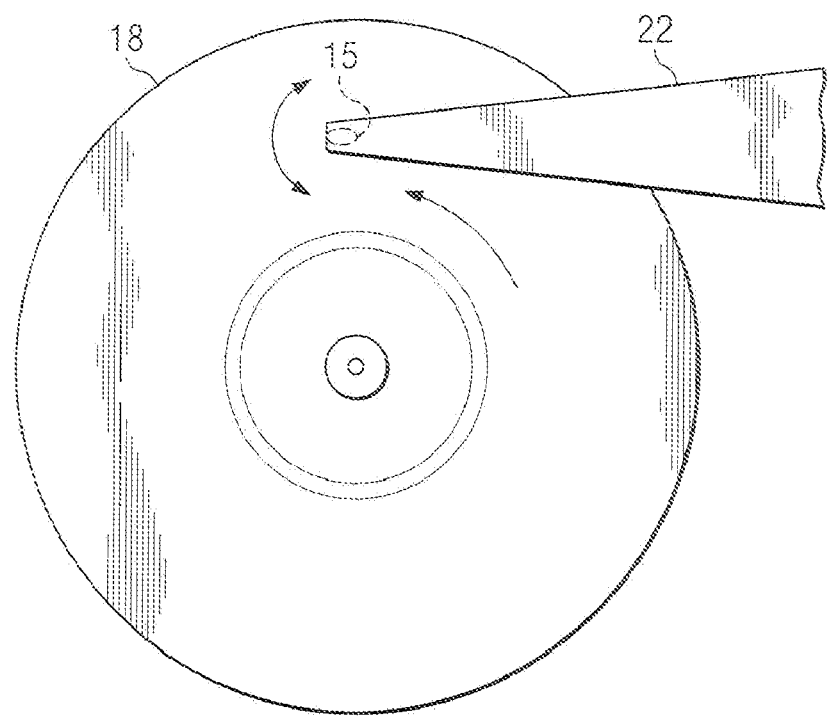
FIG. 2 is a plan view illustrating the construction of a portion of the hard disk drive in the system of FIG. 1.

FIG. 2 illustrates, in further detail, the physical arrangement of one disk surface 18 relative to its associated read/write head assembly 15. Disk surface 18 is shown, in this example, as rotating in a primary direction about its axis (counterclockwise, in this example); as known in the art, this rotation is effected by spindle motor 14 under the control of controller 5. As shown in FIG. 2, read/write head assembly 15 is disposed at the end of actuator arm 22, which is rotatable (about its axis, not shown) by actuator 17 under motive force from voice coil motor 12. Rotation of actuator arm 22 will position read/write head assembly 15 at the appropriate radial distance of disk surface 18 to access a desired track.

Figure 3:
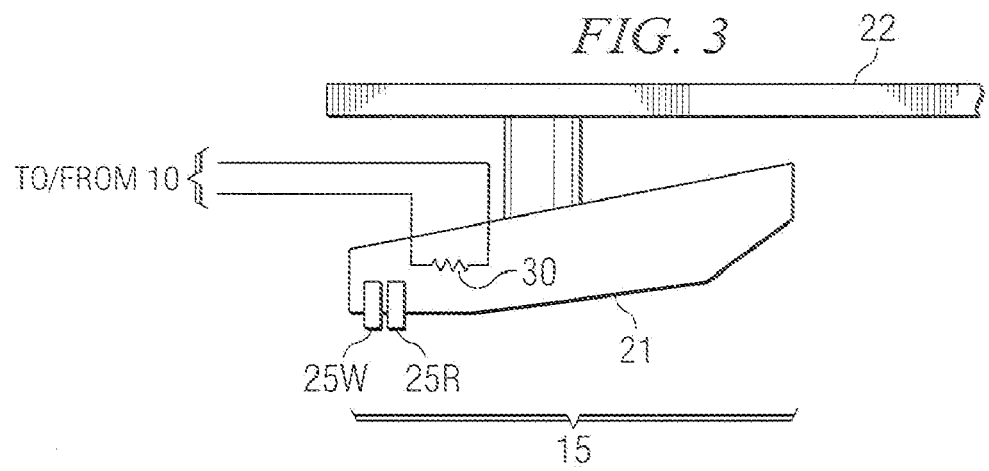
FIG. 3 is a cross-sectional view illustrating the construction of a read/write head assembly in the system of FIG. 1.

FIG. 3 illustrates the construction of read/write head assembly 15 according to the preferred embodiment of this invention. Read/write head assembly 15 includes slider 21, which is typically a ceramic, silicon, or other electrically insulating body into which read head 25R and write head 25W may be formed. The size and shape of slider 21 is designed to provide an air bearing surface (ABS) between it and rotating disk surface 18. Slider 21 is mounted to actuator arm 22 in the conventional manner.

Read head 25R and write head 25W are disposed near the trailing edge of slider 21, as defined by the rotation of disk surface 18 (see FIG. 2). The particular construction and implementation of read and write heads 25R, 25W may vary, depending on the desired disk drive construction and performance. In this embodiment of the invention, write head 25W is preferably implemented as an inductive write head, including an electromagnet formed with windings about an iron core having a gap oriented toward the bottom of slider 21, to direct the field generated by a current through the windings toward the nearby disk surface 18. Read head 25R is preferably constructed as a magnetoresistive (MR) or giant magnetoresistive (GMR) material. For example, as known in the art, a GMR element is a "stripe" of a soft magnetic material, such as iron chromide (FeCr), which has a resistance value that varies with the polarity of a magnetic field applied to the element. Alternatively, read head 25R may also be implemented as an inductive read head, in which a current is induced into an electromagnet by the magnetic field of a portion of disk surface 18 moving nearby.

According to this embodiment of the invention, read/write head assembly 15 also includes heat element resistor 30, which is shown schematically in FIG. 3. Heat element resistor 30 may be a conventional resistor of various construction (e.g., a carbon body resistor), or alternatively constructed as a resistance heater in the manner known in the art. Heat element resistor 30 is disposed within slider 21, at an appropriate position so that it can readily heat write head 25W and read head 25R. As known in the art, the fly height of a disk drive head is typically defined by the distance between the inductive heads and the disk surface, and that thermal expansion of the inductive core of the head or heads, for example due to resistive heating by the current passing through the windings, ultimately defines this distance. As illustrated in FIG. 3, for example, write head 25W and read head 25R (specifically, the "pole tips") each extend from the bottom surface of slider 21, as a result of thermal expansion caused by heat element resistor 30. According to this preferred embodiment of the invention, preamplifier and fly height controller 10 controls the current through heat element resistor 30, and thus controls the fly height of read/write head assembly 15, as will now be described relative to FIG. 4.

Figure 4:
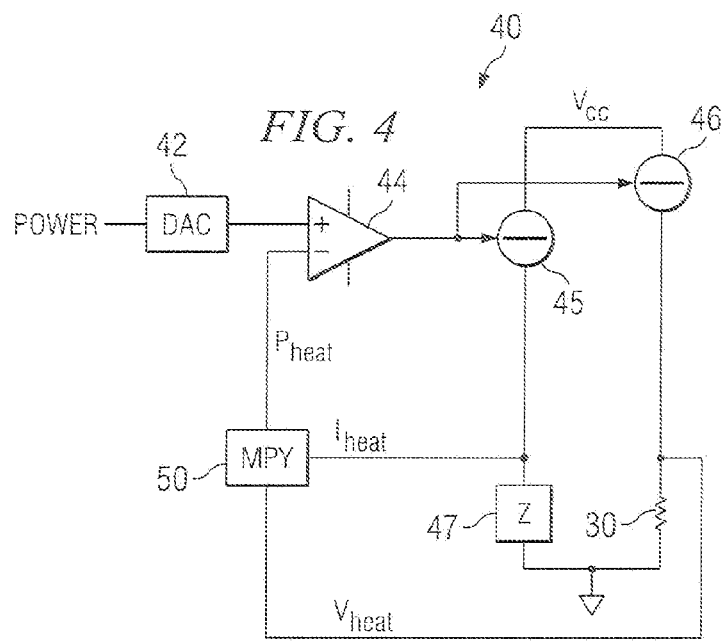
FIG. 4 is an electrical diagram, in block form, of the fly height controller in the system of FIG. 1 constructed according to the preferred embodiment of the invention.

FIG. 4 illustrates the construction of fly height controller 40, which is embodied within preamplifier 10 in the system of FIG. 1. The portion of preamplifier 10 of FIG. 1 that is in the data path between controller 2 and read/write heads 15 is not shown in FIG. 4 for the sake of clarity; that data path portion of preamplifier 10 may be realized in the conventional manner.

Fly height controller 40 operates to drive heat element resistor 30 with a current, and at a voltage, corresponding to a power input signal PWR received by digital-to-analog converter (DAC) 42, as shown in FIG. 4. It is contemplated that digital control circuitry (not shown) within disk drive controller 5 includes the appropriate functionality to select a desired nominal power level that is represented by the digital word within power input signal PWR. In the conventional manner, DAC 42 converts the digital power input signal PWR to an analog level; this analog level is applied to an input of error amplifier 44, as shown in FIG. 4.

According to this embodiment of the invention, the output of error amplifier 44 controls variable current source 46, which is coupled between a power supply voltage $V_{cc}$ and heat element resistor 30. It is contemplated that variable current source 46 is implemented in the conventional manner, for example as one or more output drive transistors receiving the output of error amplifier at a control terminal. For purposes of this invention, the specific construction of variable current source 46 is not of particular criticality; the skilled artisan having reference to this specification will be readily able to implement variable current source 46 in the best fashion appropriate for the particular implementation of this preferred embodiment of the invention. Variable current source 46 thus drives a current through heat element resistor 30, which in this case is connected between variable current source 46 and ground. Of course, heat element resistor 30 is constructed to produce heat in response to the drive current therethrough, with that heat causing the desired thermal expansion of write head 25W (and also read head 25R, if desired) so that one or more poles of write head 25W extend away from slider 21 toward but at a precise distance from disk surface 18, as described above.

As mentioned above, variable current source 45 is also controlled by the output of error amplifier 44, and sources a current into impedance 47 in response to that output signal. According to this preferred embodiment of the invention, the current source by variable current source 45 is preferably scaled down from that applied to heat element resistor 30 by a constant factor, to reduce power dissipation. This scaling is preferably accomplished by scaling of the size of the transistor or transistors used to realize variable current source 45 relative to variable current source 46. For example, according to a preferred realization of this preferred embodiment of the invention, the current conducted by variable current source 45 is scaled to be 1/100 of the current conducted by variable current source 46. As known in the art, for example if current sources 45, 46 are constructed as metal-oxide-semiconductor (MOS) devices, the channel width to channel length ratio (W/L) of a transistor used as current source 45 would be 1/100 of the W/L of the transistor used as current source 46. Such scaling is contemplated to be known and realizable by those skilled in the art having reference to this description.

According to this construction, therefore, two feedback signals are generated within fly height controller 40 and applied to multiplier 50. One feedback signal is feedback heater voltage $V_{heat}$, which is acquired at the node between current source 46 and heat element resistor 30, and which is therefore a direct measurement of the voltage across heat element resistor 30 (its other terminal being at ground). Alternatively, a differential voltage may be taken across heat element resistor 30, if it is not at ground. The second feedback signal is feedback heater current $I_{heat}$. In this example, feedback heater current $I_{heat}$ is measured as a voltage across impedance 47, with that voltage drop proportional to the current from variable current source 45, that current being scaled from the actual current sourced by current source 46 through heat element resistor 30. In this approach, the feedback signal for feedback heater current $I_{heat}$ is in the form of a voltage. Alternatively, the scaled current from current source 45 may be directly fed to multiplier 50, depending on the construction of multiplier 50, and its ability to respond to a current rather than a voltage. As such, the true current conducted by heat element resistor 30 will be scaled by the scale factor, for example 100 times the feedback heater current $I_{heat}$.

It is, of course, fundamental in the art that the power dissipation of a passive element, such as heat element resistor 30, corresponds to the product of the current through the element with the voltage across the element. Because heat element resistor 30 is a passive element, the product of the feedback signal heater current $I_{heat}$ with the feedback signal heater voltage $V_{heat}$ will produce a measure of the power dissipated by heat element resistor 30. It is also well known that the heat generated by a resistive heater is substantially proportional to the power dissipated by that resistive heater. As such, the product of feedback signal heater current $I_{heat}$ with the feedback signal heater voltage $V_{heat}$ will provide a measure of the heat generated by heat element resistor 30. According to this preferred embodiment of the invention, multiplier 45 generates an output feedback heater power voltage $P_{heat}$ that corresponds to the product of feedback signal heater current $I_{heat}$ with the feedback signal heater voltage $V_{heat}$. This signal $P_{heat}$, in the form of a voltage according to this preferred embodiment of the invention, is applied to a negative polarity input of error amplifier 44 (its positive polarity input receiving the analog version of input signal PWR). Error amplifier 44 thus produces an output signal that is applied to variable current sources 45, 46, and that is modulated according to the difference between the desired power level (signal PWR) and the actual power dissipated by heat element resistor 30 (output feedback heater power voltage $P_{heat}$). For example, if the power dissipated by heat element resistor 30 is less than the desired power, error amplifier 44 will generate a signal that increases the drive applied to variable current sources 45, 46; conversely, if the power dissipated by heat element resistor 30 exceeds the desired level, error amplifier 44 will produce a signal that decreases the drive applied to variable current sources 45, 46. Feedback control of the heat produced by heat element resistor 30 thus results.

Figure 5:
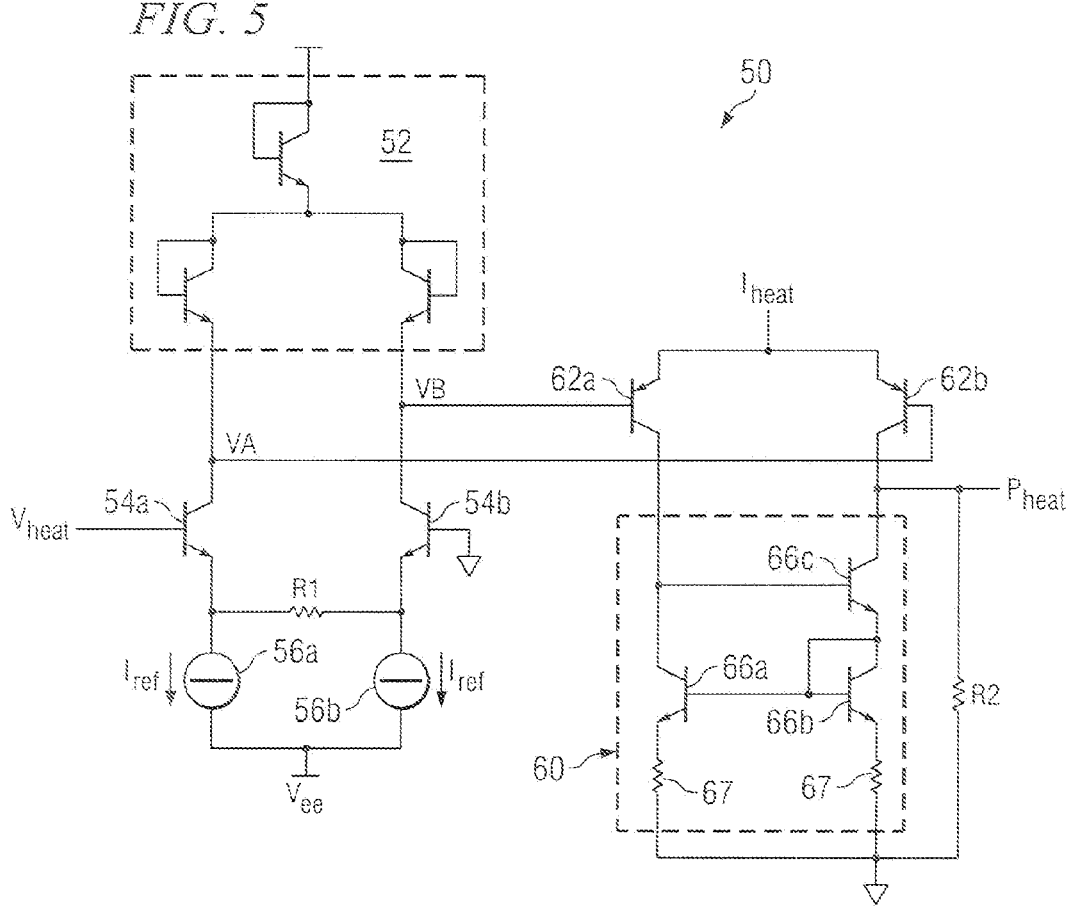
FIG. 5 is an electrical diagram, in schematic form, of the feedback multiplier circuit in the fly height controller of FIG. 4, constructed according to the preferred embodiment of the invention.

FIG. 5 illustrates the construction of multiplier 50 according to a preferred embodiment of the invention. It is, of course, contemplated that the particular construction of multiplier 50 may vary from that illustrated in FIG. 5. Such other arrangements may include paired differential amplifiers cross-coupled with one another, or a cascaded differential amplifier. These and other circuit arrangements may be used as multiplier 50. However, the construction of multiplier 50 illustrated in FIG. 5 is preferred because of its stability and precision in operation.

As shown in FIG. 5, multiplier 50 includes a differential amplifier based on n-p-n bipolar transistors 54a, 54b. The base of transistor 54a receives the feedback heater voltage $V_{heat}$. This feedback heater voltage may be applied to transistor 54a via a level shifter (not shown), constructed in the conventional manner, if necessary for translating the levels of the feedback signal to an appropriate voltage range for transistor 54a. The base of transistor 54b is at ground, in this example, considering that heat element resistor 30 is connected on one end to ground (and is at feedback heater voltage $V_{heat}$ at its other end). If a level shifter couples feedback heater voltage $V_{heat}$ to the base of transistor 54a, a similar corresponding level shifter should also couple the bias level to the base of transistor 54b, to ensure accurate operation. As such, transistors 54a, 54b define a differential amplifier that operates in response to the differential voltage between the feedback heater voltage signal $V_{heat}$ (as level-shifted) and ground.

In this differential amplifier, load 52 is connected between the collectors of transistors 54a, 54b and power supply voltage $V_{cc}$; in this example, as shown in FIG. 5, load 52 includes a pair of n-p-n bipolar transistors, each connected in diode fashion between a collector of one of transistors 54a, 54b and the emitter of a third n-p-n bipolar transistor that is also connected in diode fashion to the $V_{cc}$ power supply. Of course, other load arrangements can be used. Resistor R1 is connected between the emitters of transistors 54a, 54b. The emitter of transistor 54a is connected to the $V_{ee}$ power supply voltage through reference current source 56a, and the emitter of transistor 54b is connected to $V_{ee}$ through reference current source 56b. Reference current sources 56a, 56b each conduct reference current $I_{ref}$. According to the preferred embodiment of the invention, it is preferred that the reference current $I_{ref}$ be controlled as an absolute current to set the gain of multiplier 50, and thus the relationship of the voltage of the output feedback heater power voltage $P_{heat}$ to the actual power dissipated by heat element resistor 30. As will be described below, this gain varies inversely with reference current $I_{ref}$, and is not compensated for by another parameter. According to this preferred embodiment of the invention, therefore, reference current sources 56a, 56b are preferably "trimmed", for example by way of fusible links, laser trimming, or some other non-volatile setting, to conduct a selected absolute current level as reference current $I_{ref}$.

The differential amplifier of transistors 54a, 54b generates a differential voltage at its nodes VA, VB, in response to the differential voltage applied to the bases of transistors 54a, 54b. Node VA is at the collector of transistor 54a, while node VB is at the collector of transistor 54b. Node VA is connected to the base of p-n-p transistor 62b in a second differential amplifier, while node VB is connected to the base of p-n-p transistor 62a in this second differential amplifier. The emitters of transistors 62a, 62b are connected in common, and receive feedback heater current $I_{heat}$, which is a current signal in this example; as such, referring back to FIG. 4, impedance 47 is effectively incorporated into multiplier 50 in this implementation of the preferred embodiment of the invention.

This second differential amplifier includes current mirror load 60, such that the collector currents conducted by transistors 62a, 62b are equal to one another (or scaled by a known scale factor, if desired). In this embodiment of the invention, current mirror load 60 is connected between the collectors of p-n-p transistors 62a, 62b and ground. For the example shown in FIG. 5, current mirror load includes n-p-n transistor 66a with its collector connected to the collector of transistor 62, its emitter connected to ground through a resistor 67, and its base connected to the base of opposing n-p-n transistor 66b connected in series between ground (via another resistor 67) and the collector of p-n-p transistor 62b, which is connected in diode fashion. Third n-p-n transistor 66c in current mirror load 60 has its collector connected to the collector of transistor 62b, its emitter connected to the collector and base of transistor 66b, and its base connected to the collector of transistor 62a. In this manner, the current through the series path of transistors 66b and 66c is equal to (or scaled from) the collector current of transistor 62a as conducted through transistor 66a. The output of multiplier

50 is taken from a node at the collector of transistor 62b, across resistor R2 (having its other end connected to ground). Because of the current mirroring of current mirror load 60, the current conducted through resistor R2 depends on the differential collector currents of transistors 62a, 62b, which in turn depend on the differential voltage developed at nodes VA, VB. The amplitude of that differential collector currents depends upon the magnitude of the emitter current into transistors 62a, 62b, which in this case is feedback heater current $I_{heat}$ from variable current source 45. The output voltage at resistor R2 thus corresponds to the product of heater current $I_{heat}$ and heater voltage $V_{heat}$, and as such constitutes the output feedback heater power voltage $P_{heat}$.

In operation, referring to FIGS. 4 and 5 in combination, feedback heater voltage $V_{heat}$ across heat element resistor 30 is applied to the base of transistor 54a. Because the base of transistor 54b is at ground (corresponding to the ground connection of heat element resistor 30), feedback heater voltage $V_{heat}$ will tend to turn on transistor 54a more than transistor 54b will be turned on, lowering the voltage at node VA relative to node VB by an amount corresponding to feedback heater voltage $V_{heat}$.

This differential voltage between nodes VA, VB will be applied to transistors 62a, 62b. Because node VA will be at a lower voltage than node VB, transistor 62b will be turned on more than will transistor 62a. And because of current mirror load 60, the difference in the collector currents of transistors 62a, 62b because of the differential voltage of nodes VA, VB will be reflected in the current through resistor R2. Output feedback heater power voltage $P_{heat}$ across resistor R2 thus depends on the extent to which transistor 62b is turned on relative to transistor 62a. In this arrangement, because transistors 62a, 62b are p-n-p devices, output feedback heater power voltage $P_{heat}$ at the collector of transistors 62b will increase as transistor 62b turns on harder, and sources more collector current. And because transistor 62b turns on harder as the voltage at node VA drops in response to a higher feedback heater voltage $V_{heat}$, output feedback heater power voltage $P_{heat}$ varies directly with feedback heater voltage $V_{heat}$.

The relationship between output feedback heater power voltage $P_{heat}$ and feedback heater voltage $V_{heat}$ depends on the emitter current into transistors 62a, 62b which, in this embodiment of the invention, is set by feedback heater current $I_{heat}$. For a given feedback heater voltage $V_{heat}$, output feedback heater power voltage $P_{heat}$ also varies directly with feedback heater current $I_{heat}$. Accordingly, because output feedback heater power voltage $P_{heat}$ varies directly with both feedback heater current $I_{heat}$ and also directly with feedback heater voltage $V_{heat}$, output feedback heater power voltage $P_{heat}$ corresponds to the product of these two feedback signals, and thus corresponds to the power dissipated by heat element resistor 30.

It is useful to establish the gain of multiplier 50, such that output feedback heater power voltage $P_{heat}$ has a known and stable relationship with the power dissipated by heat element resistor 30. In the embodiment illustrated in FIG. 5, this relationship can be expressed as:

$$P_{heat} = (V_{heat} \times I_{heat})\left(\frac{R2}{R1}\right)\left(\frac{1}{100}\right)\left(\frac{1}{I_{ref}}\right), \text{ in volts}$$

In this case, the 1/100 factor reflects the scale factor between the actual current conducted through heat element resistor 30 and the scaled feedback heater current $I_{heat}$, which in this case is 100. Of course, if another scale factor is used for this current mirroring, that scale factor would be reflected in the denominator of this expression. This expression also illustrates that the resistance ratio of resistors R2 and R1 can be used to set the gain of multiplier 50. A convenient gain value can thus be set, for example with 100 milliwatts of power dissipated by heat element resistor 30 reflected as 1 volt in output feedback heater power voltage $P_{heat}$. And because multiplier 50 is preferably constructed within an integrated circuit, with resistors R1, R2 formed in that same integrated circuit, resistors R1, R2 will be well ratioed with one another, so that the resistance ratio will be quite stable over process variations. This expression also illustrates that reference current $I_{ref}$ is preferably an absolute current, because there is no compensating or matched parameter to that current in fly height controller 40. The absolute current of reference current $I_{ref}$ therefore directly affects the relationship between the power actually dissipated through heat element resistor 30 and the output feedback heater power voltage $P_{heat}$. As discussed above, it is therefore preferable that reference current sources 56a, 56b are trimmable current sources, so that the manufacturer or user can set the desired absolute current $I_{ref}$.

Referring back to FIG. 4, output feedback heater power voltage $P_{heat}$ from multiplier 50 is presented to the inverting input of error amplifier 44, such that the output of error amplifier 44 corresponds to a difference between output feedback heater power voltage $P_{heat}$ and the output of DAC 42, corresponding to the desired power signal PWR. As a result, the drive applied to variable current source 46 by error amplifier 44 is modulated until this difference reaches zero, in which case the power dissipated by heat element resistor 30 matches that of the desired power level conveyed by signal PWR.

According to this embodiment of the invention, therefore, the power dissipated by the resistive heater in the read/write head assembly of a disk drive can be closely controlled. This results in the actual heat delivered by the resistive heater being closely controlled, which in turn enables more precise control of the position of the protruding write head poles, or read/write head, as the case may be, relative to the disk surface. Because of the improvement in control of this position, commonly referred to as the fly height, the nominal fly height for the disk drive can be set to a smaller gap, which results in increased data density of the disk drive for a given bit error rate and reliability. Increased functionality in the disk drive, and systems incorporating the disk drive, can therefore be attained through this invention.

In addition, the control of the resistive heater according to this invention is effected without requiring knowledge of the absolute resistance value of the resistive heater, because it is the power dissipation that is controlled according to this invention, rather than only a current conducted by the heater, or a voltage across the heater. Furthermore, nonlinearities and other variations in the resistance of the resistive heater are compensated for according to this invention. For example, changes in the resistance of the resistive heater with variations in temperature, or in manufacturing process, or with variations in the voltage or current applied to the heater, are reflected in the power dissipated and measured according to this invention. Because it is the power that is reflected in the feedback control, eventually the power dissipated by the heater will match the desired level, regardless of the instantaneous resistance value of the resistive heater. Therefore, not only is the precision of the control improved according to this invention, but this precise control is made more robust, over a wider range of operating and manufacturing variations.

It is contemplated that various alternatives and variations to the circuitry and architecture described in this specification will be apparent to those skilled in the art having reference to this specification, and that such alternatives and variations are within the scope of this invention. For example, it is contemplated that the circuitry may be realized by way of MOS or CMOS technology, the combination of bipolar and CMOS technology, or other integrated circuit technologies as suitable for a given implementation. Further in the alternative, timing control of the drive applied to heat element resistor 30, so that a different level of current is driven in write operations relative to read operations, may also be implemented within fly height controller 40. An example of such control is described in copending and commonly assigned U.S. patent application Ser. No. 10/715, 217, filed Nov. 17, 2003, and published as U.S. Patent Application Publication No. US 2005/0105204 on May 19, 2005, and incorporated herein by this reference.

While this invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as claimed.

What is claimed is:

1. Fly height controller circuitry for controlling the power applied to a resistive heater in a disk drive head, comprising:
   an error amplifier, having a first input receiving a desired power level signal, having a second input receiving a feedback power signal, and having an output at which the error amplifier presents an error signal responsive to a difference between the signals at its first and second inputs;
   a first variable current source, having a control input coupled to the output of the error amplifier, for sourcing an output current into the resistive heater;
   a second variable current source, having an input coupled to the output of the error amplifier, for generating a feedback heater current signal based on an output current scaled relative to the output current sourced by the first current source; and
   a multiplier, for generating the feedback power signal corresponding to a product of the feedback heater current signal with a feedback voltage corresponding to a voltage at the resistive heater.

2. The circuitry of claim 1, further comprising:
   an impedance coupled to the current sensor, so that a voltage between the impedance and the current sensor corresponds to the feedback heater current signal.

3. The circuitry of claim 1, wherein the multiplier has a first input coupled to the current sensor to receive the feedback heater current signal, and wherein the multiplier has a second input coupled to the output of the variable current source, to receive a feedback heater voltage signal corresponding to the voltage at the resistive heater.

4. The circuitry of claim 3, wherein the multiplier comprises:
   a first amplifier, having a first input coupled to receive the feedback heater voltage signal, for producing a differential voltage responsive to the feedback heater voltage signal;
   a second amplifier, having first and second inputs receiving the differential voltage from the first amplifier, and having a bias terminal receiving the feedback heater current signal, for developing an output voltage responsive to the differential voltage form the first amplifier and responsive to the feedback heater current signal.

5. The circuitry of claim 4, wherein the first amplifier comprises:
   a load;
   a first transistor having a conduction path coupled between the load and a first reference current source, and having a control terminal receiving the feedback heater voltage signal;
   a second transistor having a conduction path coupled between the load and a second reference current source, and having a control terminal at a bias voltage; and
   a first resistor coupled between the conduction paths of the first and second transistors;
   wherein the first amplifier produces a differential voltage between a first node at a point between the load and the conduction path of the first transistor, and a second node at a point between the load and the conduction path of the second transistor.

6. The circuitry of claim 5, wherein the bias voltage is ground.

7. The circuitry of claim 5, wherein the first and second current sources comprise trimmable current sources.

8. The circuitry of claim 5, wherein the second amplifier comprises:
   a current mirror load;
   a third transistor having a conduction path coupled on one end to receive the feedback heater current signal and coupled on another end to the current mirror load, and having a control terminal coupled to the second node of the first amplifier;
   a fourth transistor having a conduction path coupled on one end to receive the feedback heater current signal and coupled on another end to the current mirror load, and having a control terminal coupled to the first node of the first amplifier; and
   a second resistor, coupled to a node between the conduction path of the fourth transistor, for presenting a voltage corresponding to the product of the feedback heater current signal with a feedback voltage.

9. A disk drive system, comprising:
   a first rotatable magnetic disk surface;
   a first head assembly positionable near the first rotatable magnetic disk surface, and comprising:
   a slider;
   a write head disposed in the slider; and
   a resistive heater disposed in the slider;
   a preamplifier coupled to the write head, for controlling current applied to the write head in a write operation; and
   fly height controller circuitry, comprising:
   an error amplifier, having a first input receiving a desired power level signal, having a second input receiving a feedback power signal, and having an output at which the error amplifier presents an error signal responsive to a difference between the signals at its first and second inputs;
   a first variable current source, having a control input coupled to the output of the error amplifier, for sourcing an output current into the resistive heater;
   a second variable current source, having an input coupled to the output of the error amplifier, for generating a feedback heater current signal based on an output current scaled relative to the output current sourced by the first current source; and a multiplier, for generating the feedback power signal corresponding to a product of the feedback heater current signal with a feedback voltage corresponding to a voltage at the resistive heater.

10. The system of claim 9, wherein the fly height controller circuitry further comprises:

an impedance coupled to the current sensor, so that a voltage between the impedance and the current sensor corresponds to the feedback heater current signal.

11. The system of claim 9, wherein the multiplier has a first input coupled to the current sensor to receive the feedback heater current signal, and wherein the multiplier has a second input coupled to the output of the variable current source, to receive a feedback heater voltage signal corresponding to the voltage at the resistive heater.

12. The system of claim 11, wherein the multiplier comprises:

a first amplifier, having a first input coupled to receive the feedback heater voltage signal, for producing a differential voltage responsive to the feedback heater voltage signal;

a second amplifier, having first and second inputs receiving the differential voltage from the first amplifier, and having a bias terminal receiving the feedback heater current signal, for developing an output voltage responsive to the differential voltage form the first amplifier and responsive to the feedback heater current signal.

13. The system of claim 12, wherein the first amplifier comprises:

a load;

a first transistor having a conduction path coupled between the load and a first reference current source, and having a control terminal receiving the feedback heater voltage signal;

a second transistor having a conduction path coupled between the load and a second reference current source, and having a control terminal at a bias voltage; and a first resistor coupled between the conduction paths of the first and second transistors;

wherein the first amplifier produces a differential voltage between a first node at a point between the load and the conduction path of the first transistor, and a second node at a point between the load and the conduction path of the second transistor.

14. The system of claim 13, wherein the bias voltage is ground, and wherein the resistive heater is connected between the output of the variable current source and ground.

15. The system of claim 13, wherein the first and second current sources comprise trimmable current sources.

16. The system of claim 13, wherein the second amplifier comprises:

a current mirror load;

a third transistor having a conduction path coupled on one end to receive the feedback heater current signal and coupled on another end to the current mirror load, and having a control terminal coupled to the second node of the first amplifier;

a fourth transistor having a conduction path coupled on one end to receive the feedback heater current signal and coupled on another end to the current mirror load, and having a control terminal coupled to the first node of the first amplifier; and a second resistor, coupled to a node between the conduction path of the fourth transistor, for presenting a voltage corresponding to the product of the feedback heater current signal with a feedback voltage.

17. A method of controlling fly height of a read/write head in a disk drive by controlling power applied to a resistive heater in the read/write head, comprising the steps of:

sensing a voltage at the resistive heater;

sensing a current applied to the resistive heater;

receiving a feedback heater current signal corresponding to the sensed current, the feedback heater current signal scaled relative to the current applied to the resistive heater;

generating a feedback power signal corresponding to the product of the feedback heater current signal and the sensed voltage;

comparing the feedback power signal to a desired power signal to produce a power error signal; and modulating the current applied to the resistive heater responsive to the power error signal.

18. The method of claim 17, wherein the generating step comprises:

applying the sensed voltage to a first amplifier to generate a differential voltage responsive to the sensed voltage;

applying the differential voltage to a second amplifier;

applying the feedback heater current signal to the second amplifier; and operating the second amplifier to develop the feedback power signal responsive to the differential voltage and the feedback heater current signal.

* * * * *